United States Patent [19]
Bennett et al.

[11] 3,714,648
[45] Jan. 30, 1973

[54] TIME-TO-COLLISION CIRCUITRY FOR COLLISION WARNING SYSTEM

[75] Inventors: David B. Bennett; Robert J. Follen, both of Minneapolis; Charles P. Harman, Jr., Roseville, all of Minn.

[73] Assignee: Honeywell Inc., Minneapolis, Minn.

[22] Filed: Oct. 22, 1971

[21] Appl. No.: 191,626

[52] U.S. Cl. .......................... 343/5 DP, 343/112 CA
[51] Int. Cl. .................................................. G01s 9/02
[58] Field of Search .................... 343/5 DP, 112 CA

[56] References Cited

UNITED STATES PATENTS

| | | | |
|---|---|---|---|
| 3,167,772 | 1/1965 | Bagnall, Jr. et al. | 343/112 CA |
| 3,353,177 | 11/1967 | Wilmot | 343/5 DP |
| 3,403,396 | 9/1968 | Van Popta et al. | 343/5 DP |

*Primary Examiner*—Malcolm F. Hubler
*Attorney*—Charles J. Ungemach et al.

[57] ABSTRACT

Circuitry for processing range, azimuth, and altitude data for determining time-to-collision (tau) between helicopters or other aircraft. Range data and azimuth data is received and stored in a fast, variable increment range register and fast azimuth registers respectively. Range data received at high rates is then transferred to two sets of slow registers in accordance with the azimuth and relative altitude of the range data. Results of successive sets of interrogations are compared to detect changes in range corresponding to a predetermined range of tau values.

5 Claims, 5 Drawing Figures

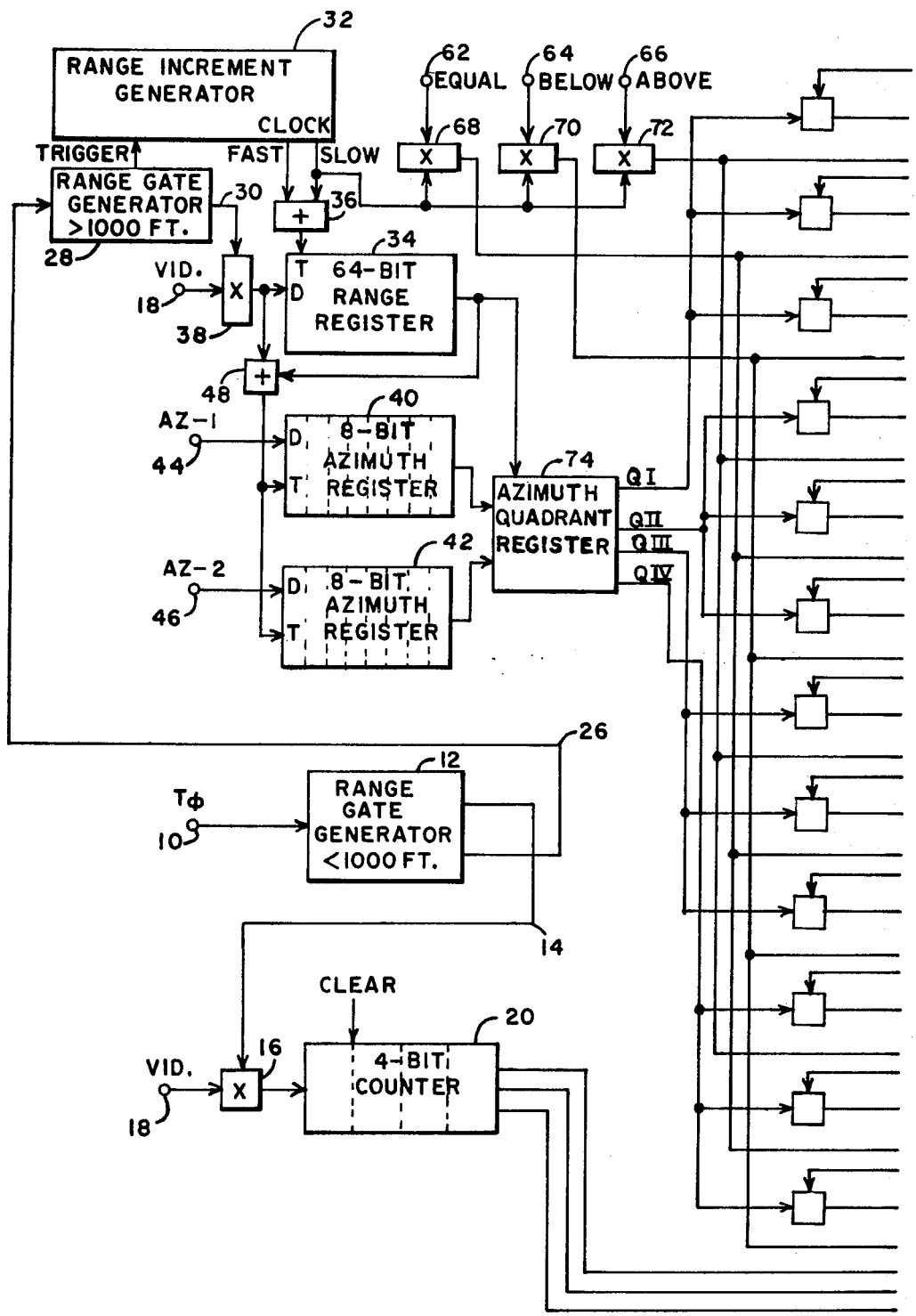
FIG. IA

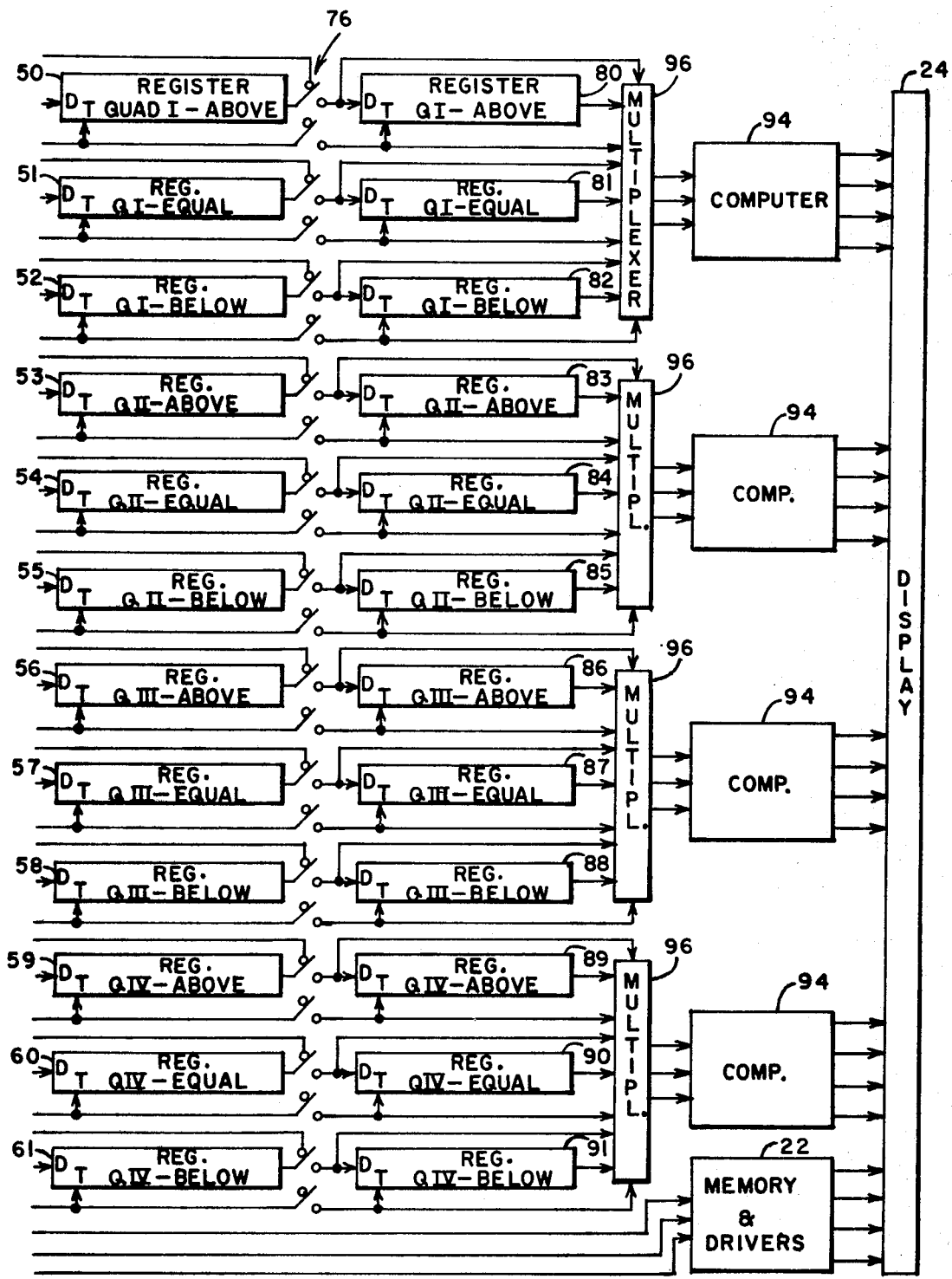
FIG. IB

TIME-TO-COLLISION CIRCUITRY FOR COLLISION WARNING SYSTEM

BACKGROUND OF THE INVENTION

The invention relates generally to circuitry for processing range, azimuth, and altitude data. As a result of the processing, warning signals are generated whenever the time-to-collision between aircraft using the invention is less than a predetermined range of tau values.

The time-to-collision circuitry described herein requires various input data, gating and control signals from external sources not shown. The input data required is range data in the form of video returns and digital azimuth data associated with the range data. The range data may be supplied by a Proximity Warning System (PWS) like that described in U. S. Pat. No. 3,603,993 and the azimuth data may be supplied by an azimuth decoder system like that described in a commonly owned U. S. Pat. application Ser. No. 155,747, filed 23 June 1971. The external gating signals required are a function of the relative altitude band in which the interrogation is taking place. The relative altitude bands are designated ABOVE, EQUAL and BELOW. The external control signal required is a series of periodic pulses called $T_\phi$ pulses which synchronize the time-to-collision circuitry with the interrogations of the system supplying range data. The $T_\phi$ pulses mark the beginning of each interrogation. The relative altitude gating signals and the $T_\phi$ pulses may be supplied by the system of U.S. Pat. No. 3,603,993.

SUMMARY OF THE INVENTION

The invention comprises circuitry for determining the time-to-collision of aircraft in a cooperative interrogator-responder system. Interrogations occur with respect to bands of relative altitude, and range and azimuth data is received from each responding aircraft and accumulated in a set of relatively fast registers. The accumulated range data is then transferred to a first set of 12 relatively slow registers as a function of azimuth and relative altitude. Range data is accumulated in the first slow register set over a predetermined number or set of interrogations and during the next set of interrogations is transferred to a second set of 12 relatively slow registers while later range data is again being accumulated in the first register set. When the later range data is accumulated it is compared with the earlier data to determine time-to-collision which equals $R_2/[(R_1 - R_2)/TB]$ where $R_2$ is the later range data, $R_1$ is the earlier range data and T is the period of the basic interrogation cycle, that is, the predetermined number or set of interrogations. If time-to-collision with a responding aircraft is less than about 13–17 seconds a display is activated and indicates the quadrant and relative altitude of the responding aircraft. The fast range data register is clocked at a variable, decreasing rate so that the range increments increase with increasing range. This among other things simplifies the calculation of time-to-collision.

DESCRIPTION OF THE DRAWINGS

FIGS. 1A and 1B taken together form a schematic block diagram of the time-to-collision circuitry which may be used in a collision warning system;

DESCRIPTION AND OPERATION

Figure 2:
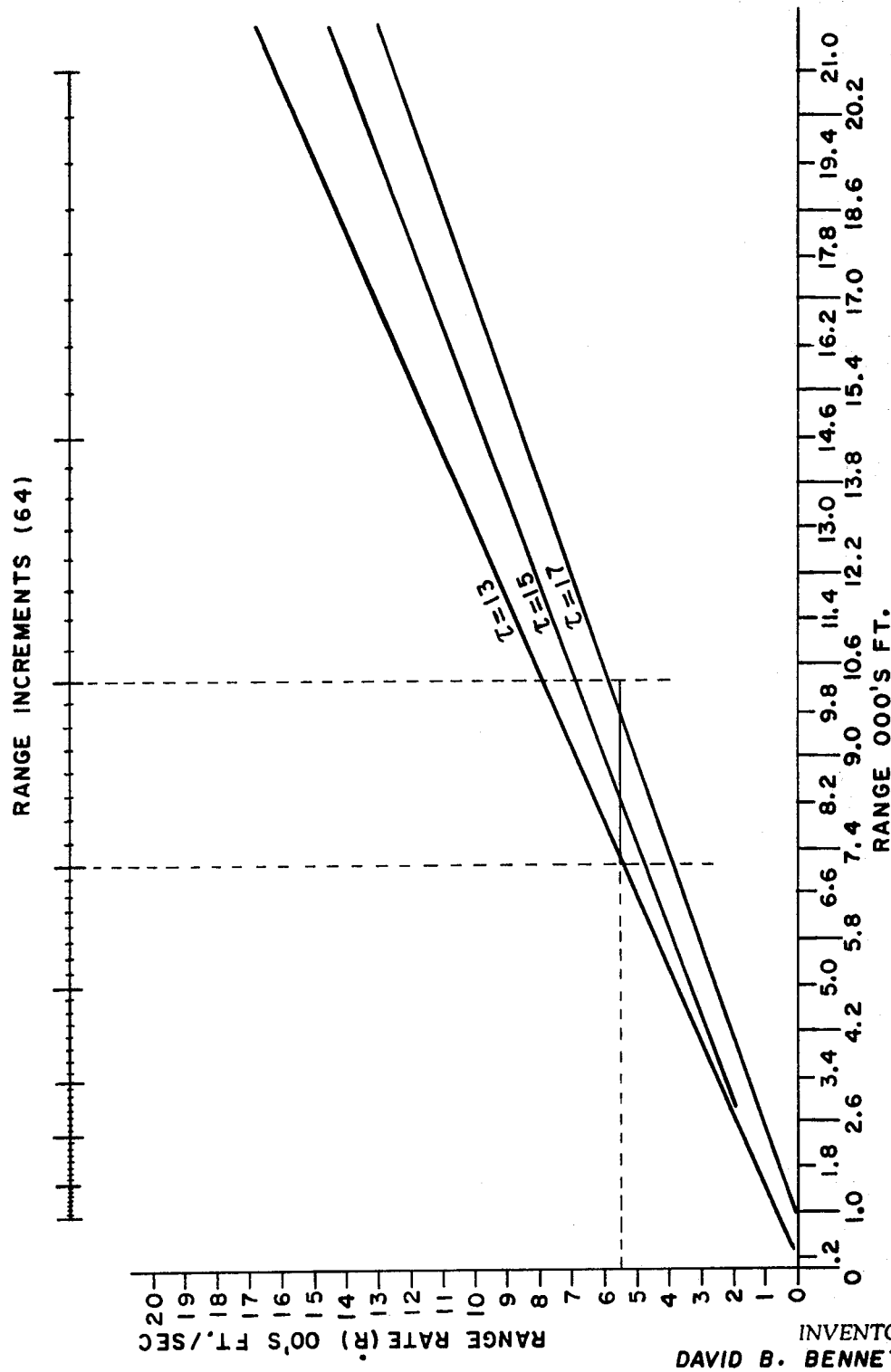
FIG. 2 is a graph showing the interrelationships between the variable range increments, range, and range rate.

At the start of each interrogation by the PWS a $T_\phi$ pulse (zero time pulse) present at input terminal 10 in FIG. 1 triggers a near range (less than 1000 feet) gate generator 12 which develops a gating pulse on line 14 beginning at time $T_\phi$ and having a width of about 2 microsec. which corresponds to a radar range of 0–1000 feet. This range gate enables an AND gate 16 so that during the enable, range data from responding aircraft within a range of 1000 feet, in the form of video returns present at input terminal 18, is received by a four-bit counter 20. Counter 20 accumulates the near range returns from four successive interrogations in each of the three relative attitude bands (ABOVE, EQUAL, and BELOW). After every fourth interrogation the contents of counter 20 is transferred to a unit 22 containing a memory in the form of a two-bit counter, and drivers. If for any set of four interrogations in a relative altitude band two or more video returns are received by the memory in unit 22, the drivers operate to activate a visual display 24 which indicates the relative altitude and the near range of the return.

Range gate generator 12 also develops a second pulse, identical to that on line 14, on a line 26. The trailing edge of this second pulse triggers a far range (greater than 1000 feet) gate generator 28 which generates a far range gate on line 30 having a width of about 38 microsec. beginning at 2 microsec. after $T_\phi$ corresponding to a radar range of about 1000–20,000 feet.

Generator 28 also triggers a range increment generator 32 at the beginning of the far range gate. Generator 32 develops two successive trains of 64 clock pulses for controlling a 64-bit fast (16 megacycle) range register 34. The first pulse train called the fast clock has a frequency which decreases with time which results in the eight groups of eight varying range increments shown at the top of the graph of FIG. 2. The frequency of the second pulse train called the slow clock is constant at about 500 kilocycles per sec. The fast and slow clock pulse trains are successively applied to register 34 by means of an OR gate 36.

Range data in the form of video returns present at input terminal 18 are applied to register 34 by means of an AND gate 38 which is enabled by the far range gate on line 30. As the range data is received, the fast clock pulses operating on the range register 34 cause the data to be progressively shifted to the right until at the end of 64 fast clock pulses the range register contains all the range data associated with one interrogation. The range data received earliest is located at the right end of register 34, the latest at the left end. Because the fast clock frequency decreases with time during an interrogation the left hand stages of register 34 represent greater increments of range than the right hand stages.

This is done because in providing a warning at a given tau (timetto-collision) with a given interrogation rate the necessary change in range (range rate) varies directly with the range.

The use of this technique simplifies the comparison of the range data of successive interrogations or sets of interrogations which occurs at another section of the circuitry.

Simultaneously with the storage of range data in register 34, azimuth data is being stored in a pair of eight-bit fast (16 mc.) azimuth registers 40 and 42. The azimuth data, received from the azimuth indicating apparatus and present at input terminals 44 and 46, is clocked into registers 40 and 42 respectively by the range data acting through an OR gate 48. The azimuth data is denoted Azimuth No. 1 (term. 44) and Azimuth No. 2 (term. 46) and is coded as follows:

| Az-1 | Az-2 | Quadrant |
|---|---|---|
| 1 | 1 | Front (I) |
| 0 | 1 | Right (II) |
| 0 | 0 | Rear (III) |
| 1 | 0 | Left (IV) |

Therefore assuming there are eight video returns resulting from an interrogation there are eight pairs of bits stored in registers 40 and 42 corresponding to the azimuth of the video returns.

The range data in register 34 is now transferred to a first set of slow (1 megacycle) 64-bit registers 50, 51, 52, 53, 54, 55, 56, 57, 58, 59, 60, and 61. A single item of range data stored in fast register 34 is transferred to one of the slow registers in accordance with the azimuth and relative altitude of the item of range data. During transfer the slow clock pulses of generator 32 become operative and control the shifting of register 34. The slow clock pulses are also used to control the shifting of registers 50–61. EQUAL, BELOW and ABOVE relative altitude gating signals supplied by the PWS and periodically present at input terminals 62, 64, and 66 enable AND gates 68, 70, and 72 respectively. Each of these AND gates when enabled allows slow clock pulses to pass and control subsets of 4 registers in the set 50–61. For example, when the EQUAL relative altitude band has been interrogated and range data is ready to be transferred from register 34, the EQUAL gating signal is present at terminal 62, enabling AND gate 68 which then passes slow clock pulses to registers 51, 54, 57, and 60. During the BELOW gating signal slow clock pulses control registers 52, 55, 58, and 61; during the ABOVE gating signal slow clock pulses control registers 50, 53, 56, and 59.

As register 34 is shifted by the slow clock pulses the range data stored therein is transferred to an azimuth quadrant generator 74 which "steers" the received range data to one of four output lines Q I–Q IV depending on the quadrant of each item of range data. This "steering" function is accomplished by the use of the azimuth data in registers 40 and 42. The range data shifted out of register 34 and operating through OR gate 48 is also used to clock registers 40 and 42 so that each time an item of range data is transferred to the azimuth quadrant generator 74 the associated item of azimuth data is also transferred. The range data is "steered" to a subset of three registers in set 50–61 in accordance with the azimuth data as follows:

| Az-1 | Az-2 | Output Line (Reg. 74) | 3-Register subset |
|---|---|---|---|
| 1 | 1 | Q I | 50, 51, 52 |
| 0 | 1 | Q II | 53, 54, 55 |
| 0 | 0 | Q III | 56, 57, 58 |
| 1 | 0 | Q IV | 59, 60, 61 |

The range data on output lines Q I–Q IV is transferred to the set of registers 50–61 through a set of 12 OR gates, one associated with each register in the set.

At the end of 64 slow clock pulses the range data, assumed here to comprise eight items, has been transferred from fast register 34 to the set of slow registers 50–61 in accordance with the azimuth and relative attitude of the items of range data. Four such interrogations are made at the same relative altitude. As the latest range data is being transferred from register 34 to the set of registers 50–61, the range data then present is circulated by throwing a 24-pole double-throw electronic switch 76 to its upper position. In this position as the latest range data is being transferred to registers 50–61 they are being shifted and as they shift the previously stored data is passed through the 12 OR gates associated with registers 50–61 and recirculated through the registers. Thus, the results of four interrogations at the same relative altitude are superimposed in appropriate registers of set 50–61.

After making four interrogations in one of the three relative altitude bands, e.g., the EQUAL band, four interrogations are made in the BELOW band followed by four interrogations in the ABOVE band. This sequence involves 12 separate interrogations and is carried out four times for a total of 48 interrogations. With a $T_\phi$ pulse frequency of 32 per sec., 48 interrogations takes 1.5 sec. After 48 interrogations the data in registers 50–61 is transferred to a similar set of slow registers 80–91. This occurs after the 48th interrogation. To accomplish this, switch 76 is thrown to its lower position connecting registers 80–91 to the source of slow clock pulses and connecting the data output of registers 50–61 to the data input of registers 80–91 respectively. Thus the "new" range data is transferred from registers 50–61 into registers 80–91. Then switch 76 is thrown into its upper position and a complete set of "new" range data is accumulated in registers 50–61 which can be compared with the "old" range data stored in registers 80–91.

The comparison of "old" and "new" range data takes place in a computer 94 (shown in four sections) which includes a memory, a processor, and drivers. The comparison occurs when the "new" range data which is being transferred from registers 50–61 to registers 80–91 is also transferred to computer 94 through a multiplexer 96 (shown in 4 sections). At the same time that "new" range data is being accepted by registers 80–91 the "old" range data in registers 80–91 is being shifted and transferred through multiplexer 96 to computer 94. The comparison takes place serially and because of the variation in range increments is simplified. By varying or weighting the range increments the change in range increments necessary to produce a warning is normalized and computation is simplified. For example, assume that the operating range of a system is 0–10,000 feet and a warning is desired when tau is equal or less than 50 sec. At a range of 10,000 feet the range rate necessary for a tau of 50 sec. or less is 200 ft./sec. or more. Assume that the system is designed such that a change of two range increments between interrogations is necessary before a warning signal is generated and that the interrogation rate is 1 per sec. Then at a range of 10,000 feet the range increments must represent 100 feet of range. At a range of 5000 feet however, the range rate required for a tau of 50 sec. or less is only half of that at 10,000 feet and the range increments must represent only 50 feet of range if the same change of two increments is to be the criteria for generating a warning signal. Obviously, this is a very simple example merely to show how computations may be simplified and the basis for using variable range increments.

When a tau between about 13–17 is detected in computer 94 the drivers therein energize display 24 which visually indicates the quadrant and relative altitude of the potentially dangerous aircraft or other object.

Figure 3:
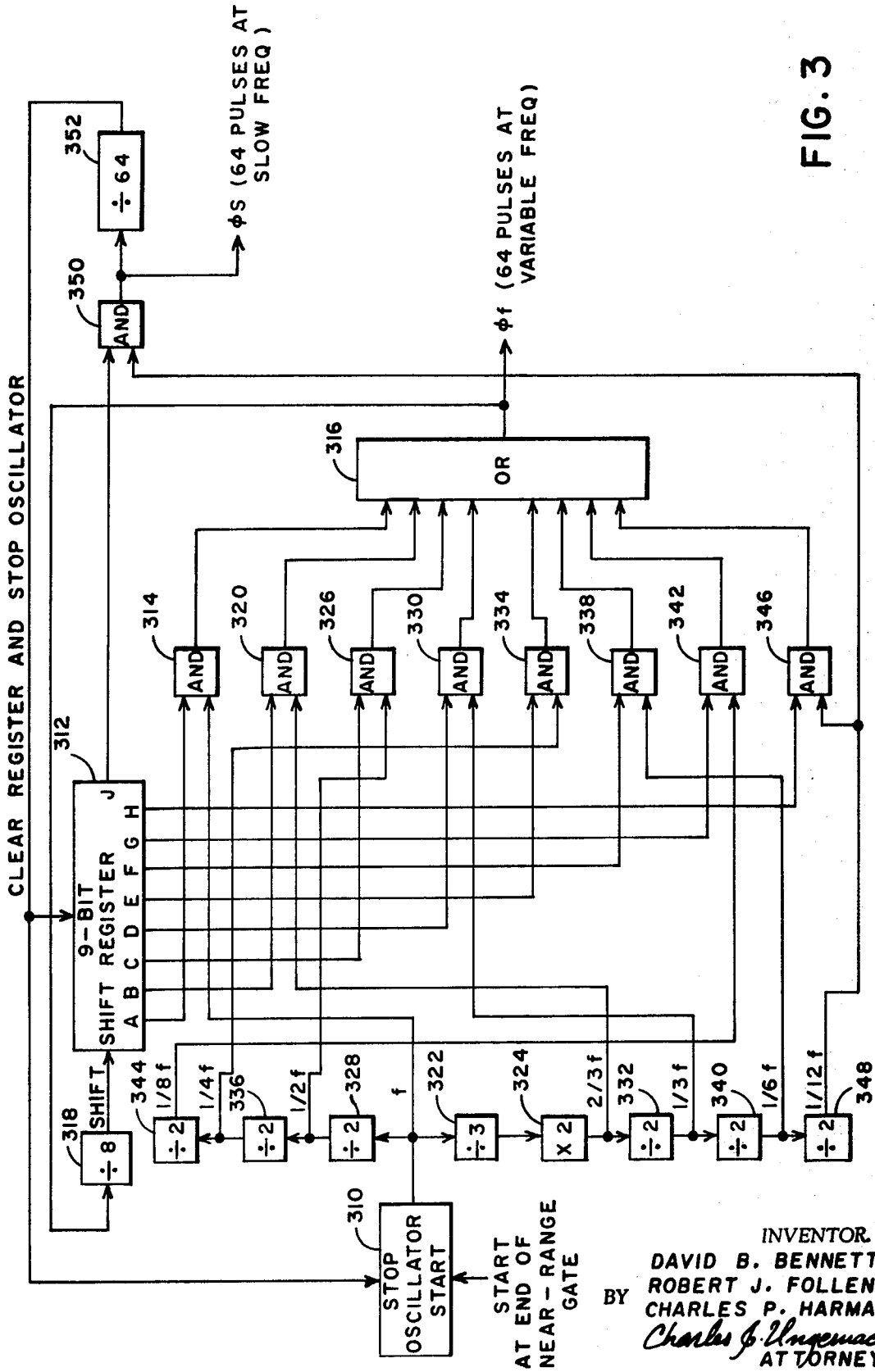
FIG. 3 is a schematic block diagram of a variable range increment generator which provides variable, fast clock pulses and fixed, slow clock pulses; and, FIG. 4 is a schematic block diagram of the relatively fast range register and two fast azimuth registers associated with the range register.

FIG. 3 is a detailed block diagram of the range increment generator 32 of FIG. 1A. Prior to the receipt of a start trigger pulse, oscillator 310 is disabled and output A of the nine-bit shift register 312 is enabled, enabling an AND gate 314. All other outputs are disabled. The receipt of a start pulse, or trigger, enables oscillator 310 which develops pulses at a frequency $f$. These pulses are passed through AND 314 and OR 316 until eight pulses have occurred after which a shift command out of a divide-by-8 circuit 318 causes output B of register 312 to be enabled and output A to be disabled. Output B enables AND 320. The output pulses of oscillator 310 are divided by 3 and multiplied by 2 by circuits 322 and 324 respectively so that the output of circuit 324 has a frequency of ⅔$f$. These pulses are passed through AND 320 and OR 316 and after eight pulses have occurred a shift command out of the divide-by-8 circuit 318 causes output C of register 312 to be enabled and output B to be disabled. Output C enables AND 326. Circuit 322 and other circuits in FIG. 3 that perform a division function may be counters. Circuit 324 and other circuits in FIG. 3 that perform the function of multiplication by 2 may use a number of well known techniques, one of which calls for differentiation of the oscillator pulses (which form a square wave) and inverting the negative portions of the differentiated square wave. The output of oscillator 310 is divided by 2 by a circuit 328 and the output pulses at a frequency of ½$f$ are passed by AND 326 and OR 316. After 8 pulses register 312 is shifted, enabling output D and disabling output C. Output D enables AND 330. The output of circuit 324 is divided by 2 by circuit 332 and the resulting pulses at a frequency of ⅓$f$ pass through AND 330 and OR 316 until register 312 is shifted after 8 pulses, enabling output E and disabling D. Output E enables AND 334. The output of circuit 328 is divided by 2 by circuit 336 resulting in pulses at a frequency of ¼$f$ which pass through AND 332 and OR 316 until register 312 is again shifted after eight pulses, enabling output F and disabling output E. Output F enables AND 338. The output of circuit 332 is divided by 2 by circuit 340, resulting in pulses at a frequency of (1/6)$f$ which pass through AND 338 and OR 316 until register 312 is again shifted enabling output G and disabling output F. Output G enables AND 342. The output of circuit 336 is divided by 2 in circuit 344, the resulting pulses at a frequency of ⅛$f$ pass through AND 346 and OR 316 until register 312 is shifted after eight pulses, disabling output G and enabling output H which enables AND 346. The output of circuit 340 is divided by 2 by circuit 348, the resulting pulses at a frequency of (1/12)$f$ passing through AND 346 and OR 316 until after eight pulses, register 312 is again shifted, disabling output H and enabling output J. In this sequence eight groups of eight pulses of varying frequency have been developed at the output of OR 316. These are the so called fast clock pulses ($\phi f$) corresponding to the set of 64 variable range increments shown in FIG. 2. Following the fast clock pulses 64 slow clock pulses at a frequency of (1/12)$f$ are developed. Output J of register 312 enables AND 350 and pulses from circuit 348 pass through and are counted in circuit 352 which after counting 64 pulses generates a signal that clears register 312 and stops oscillator 310. The output of AND 350 forms the 64 pulses of the slow clock ($\phi s$). Assuming the frequency of the slow clock is 500 kilocycles which equals (1/12)$f$, $f$ is 6 megacycles.

Figure 4:
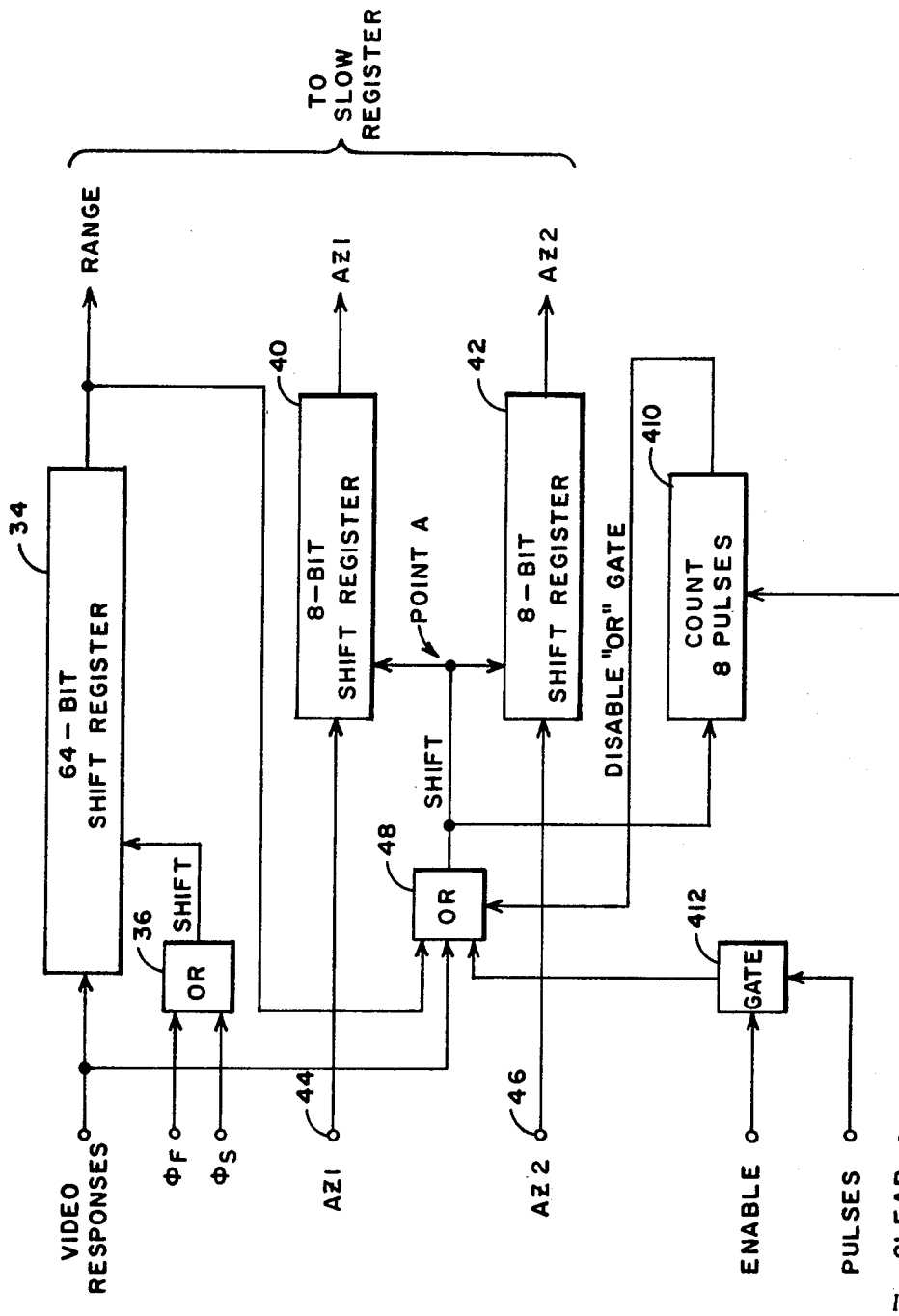

In describing the operation of the system in FIG. 1 it was assumed that there were eight video responses so that registers 40 and 42 were both full and were synchronized with register 34. When using eight-bit azimuth registers there is a problem however if there are more than or less than eight video returns. The circuitry of FIG. 4 solves this problem. Initially registers 34, 40, and 42 are empty as is eight-pulse counter 410. Video responses occurring during the fast clock period are clocked into register 34. Each video pulse, acting through OR 48 also clocks Az–1 and Az–2 data into register 40 and 42. Each pulse occurring at the output of OR 48 shifts the azimuth data one bit to the right. Thus, after three video responses are received, the first three bits at the left of registers 40 and 42 contain azimuth data. Azimuth data is stored for a maximum of 8 video responses.

Each video pulse passing through OR 48 is counted in counter 410. If more than 8 video returns are received during the fast clock period a signal from counter 410 disables OR 48 to prevent additional azimuth data from being clocked into registers 40 and 42. The azimuth registers 40, 42 are full and the data in the right-most bit corresponds to the first video response stored in register 34.

If less than eight video responses are received during the fast clock period AND 412 is enabled. This causes pulses (pseudo video responses) to be applied to OR 48, which passes them until counter 410 after counting enough extra pulses to make a total of eight disables OR 48. The azimuth data in the right-most bit of registers 40, 42 again corresponds to the first video response stored in register 34. The pseudo video responses may automatically follow the fast clock period if OR 48 has not been disabled.

At the end of this sequence the 64 slow clock pulses $\phi s$ cause the data in registers 34, 40, and 42 to be transferred to the set of slow registers 50–61. As a stored video response (range pulse) is shifted out of the right of register 34 it is also coupled through OR 48 and causes one azimuth bit from each of registers 40, 42 to be simultaneously shifted out. Thus each range pulse transferred is accompanied by the corresponding two azimuth bits. At the end of this transfer, registers 34, 40, and 42 and counter 410 are cleared to ready them for the next fast clock sequence.

This method is used for economy. If economy is not a factor registers 40 and 42 may also be 64 bit registers like register 34. Then azimuth data for 64 video responses could be stored. In many situations, however, more than eight video responses as a result of an interrogation is unlikely and the use of 64 bit azimuth registers is unjustified.

FIG. 2 shows the range increments (64) and their relation to range, range rate and time-to-collision (tau). A family of curves for tau = 13, 15, and 17 show the interrelationship between range and range rate. A particular range rate is selected within each set of eight range increments so that detection of the selected range rate during the increment set determines tau as being in the range of about 13–17. For example, within the sixth set of 8 range increments a range rate of about 550 ft./sec. is selected which if detected indicates a tau in the range of about 13–17. A particular range rate is selected in each set of increments to correspond with a tau of about 13–17.

Other embodiments of this invention may be devised by those skilled in the art and still be within the scope of the invention which is to be limited only by the following claims.

We claim:

1. In a collision warning system, apparatus for determining range/range rate comprising:
   a variable frequency clock;
   a high speed range register for receiving and storing range signals and synchronized to the variable frequency clock;
   first and second azimuth registers for receiving and storing azimuth signals, which are correlated with the range signals, and synchronized to the range signals and the high speed range register;
   an azimuth quadrant generator receiving the range signals from the range register and the azimuth signals from the azimuth registers and separating the range signals in accordance with their azimuth quadrant;
   means for receiving relative altitude band signals, which are correlated with the range signals, and again separating the range signals, already separated in accordance with their azimuth quadrant, in accordance with their relative altitude;
   a first set of low speed registers, one register for each set of twice separated range signals;
   a second set of low speed registers correlated to the first set;
   means for periodically transferring the range signals stored in each low speed register of the first set to the correlated register in the second set;
   means for simultaneously comparing all the range signals in the two sets of low speed registers with a predetermined set of values of range/range rate and giving an indication when a range/range rate is less than the certain set of values.

2. The apparatus of claim 1 wherein the variable frequency clock comprises:
   an oscillator developing output pulses of a frequency $f$;
   means driven by the oscillator for developing output pulses at frequencies that are submultiples of $f$;
   means for combining the oscillator output pulses and the other pulses at submultiples of the oscillator frequency in groups of pulses of descending frequency.

3. The apparatus of claim 2 wherein the submultiples of f are $\frac{2}{3}f$, $\frac{1}{2}f$, $\frac{1}{3}f$, $\frac{1}{4}f$, $(1/6)f$, $\frac{1}{8}f$, and $1/12f$, and the pulses are combined in 8 groups with 8 pulses in each group.

4. The apparatus of claim 1 wherein the azimuth registers have a predetermined number of stages which is less than those of the range register and includes means for disabling the azimuth registers after the predetermined number of range signals are received and means for shifting the azimuth registers a number of times equal to the difference if less than the predetermined number of range signals are received.

5. The apparatus of claim 1 wherein the first and second sets of low speed registers each comprise one register for each of the relative altitude bands in each quadrant, the registers are clocked by the relative altitude band signals, the range data is applied to the first set of registers in accordance with azimuth quadrant, and range data is circulated in the first set of registers a predetermined number of times.

* * * * *